(12) United States Patent
Chappell

(10) Patent No.: US 7,209,991 B2
(45) Date of Patent: Apr. 24, 2007

(54) PACKET PROCESSING IN SWITCHED FABRIC NETWORKS

(75) Inventor: Christopher L. Chappell, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 179 days.

(21) Appl. No.: 10/934,637

(22) Filed: Sep. 3, 2004

(65) Prior Publication Data

US 2006/0053240 A1  Mar. 9, 2006

(51) Int. Cl.
*G06F 13/14* (2006.01)
(52) U.S. Cl. ...................... 710/240; 711/152
(58) Field of Classification Search ............... 710/240, 710/200; 711/152, 1; 709/229
See application file for complete search history.

(56) References Cited

U.S. PATENT DOCUMENTS

| 6,061,783 A * | 5/2000 | Harriman ............. 712/224 |
| 6,260,120 B1 * | 7/2001 | Blumenau et al. ........ 711/152 |
| 2004/0128410 A1 * | 7/2004 | Mayhew et al. .......... 710/30 |

* cited by examiner

*Primary Examiner*—Rehana Perveen
*Assistant Examiner*—Clifford Knoll
(74) *Attorney, Agent, or Firm*—Fish & Richardson P.C.

(57) ABSTRACT

Methods and apparatus, including computer program products, implementing techniques for receiving a request for access to a memory space of an Advanced Switching device, the memory space including a first memory segment and a second memory segment, determining access permissions for the requested memory space, and processing the access request when an access is determined to be permitted. The techniques include identifying a source of the request as a node configuration packet processor, and denying the access if the node configuration packet processor is requesting access to the second memory segment which is assigned to a hidden storage device.

30 Claims, 6 Drawing Sheets

PACKET PROCESSING IN SWITCHED FABRIC NETWORKS

BACKGROUND

This invention relates to packet processing in switched fabric networks.

PCI (Peripheral Component Interconnect) Express is a serialized I/O interconnect standard developed to meet the increasing bandwidth needs of the next generation of computer systems. PCI Express was designed to be fully compatible with the widely used PCI local bus standard. PCI is beginning to hit the limits of its capabilities, and while extensions to the PCI standard have been developed to support higher bandwidths and faster clock speeds, these extensions may be insufficient to meet the rapidly increasing bandwidth demands of PCs in the near future. With its high-speed and scalable serial architecture, PCI Express may be an attractive option for use with or as a possible replacement for PCI in computer systems. The PCI Special Interest Group (PCI-SIG) manages PCI specifications as open industry standards, and provides the specifications to its members.

Advanced Switching (AS) is a technology which is based on the PCI Express architecture, and which enables standardization of various backplane architectures. AS utilizes a packet-based transaction layer protocol that operates over the PCI Express physical and data link layers. The AS architecture provides a number of features common to multi-host, peer-to-peer communication devices such as blade servers, clusters, storage arrays, telecom routers, and switches. These features include support for flexible topologies, packet routing, congestion management (e.g., credit-based flow control), fabric redundancy, and fail-over mechanisms. The Advanced Switching Interconnect Special Interest Group (ASI-SIG) is a collaborative trade organization chartered with providing a switching fabric interconnect standard, specifications of which it provides to its members.

DETAILED DESCRIPTION

Figure 1:
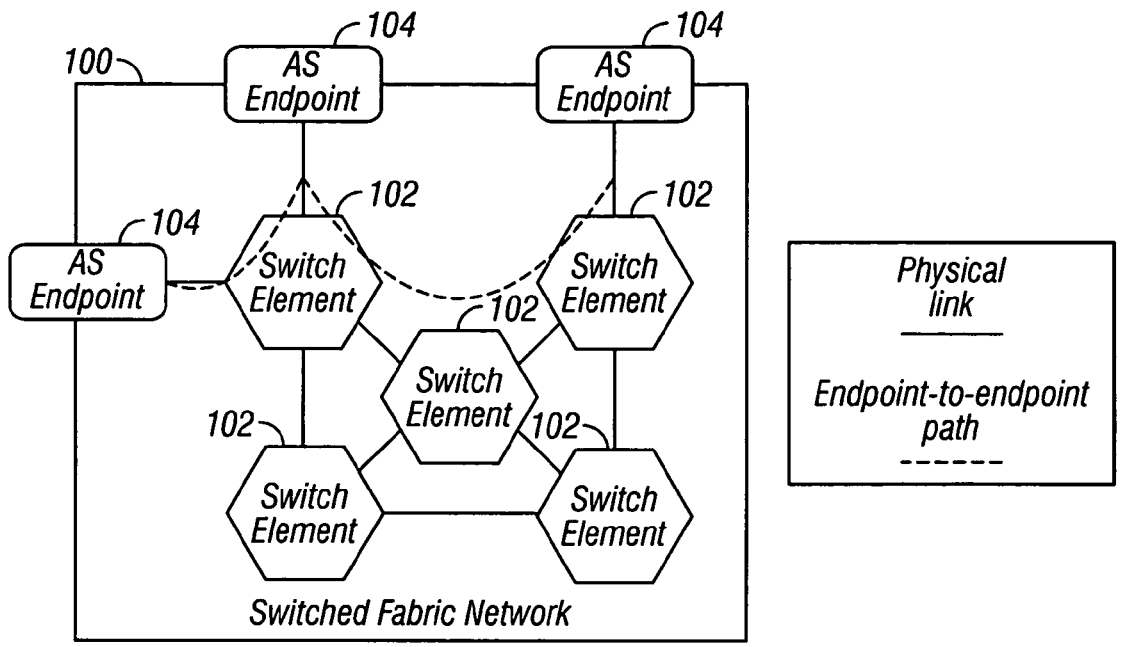
FIG. 1 is a block diagram of a switched fabric network.

FIG. 1 shows a switched fabric network 100. The network 100 may include switch elements 102 and end points 104, e.g., CPU chipsets, network processors, digital signal processors, media access and host adaptors. The switch elements 102 constitute internal nodes of the network 100 and provide interconnects with other switch elements 102 and end points 104. The end points 104 reside on the edge of the switch fabric and represent data ingress and egress points for the switch fabric. The end points 104 may encapsulate and/or translate packets entering and exiting the switch fabric and may be viewed as "bridges" between the switch fabric and other interfaces (not shown).

Figure 2:
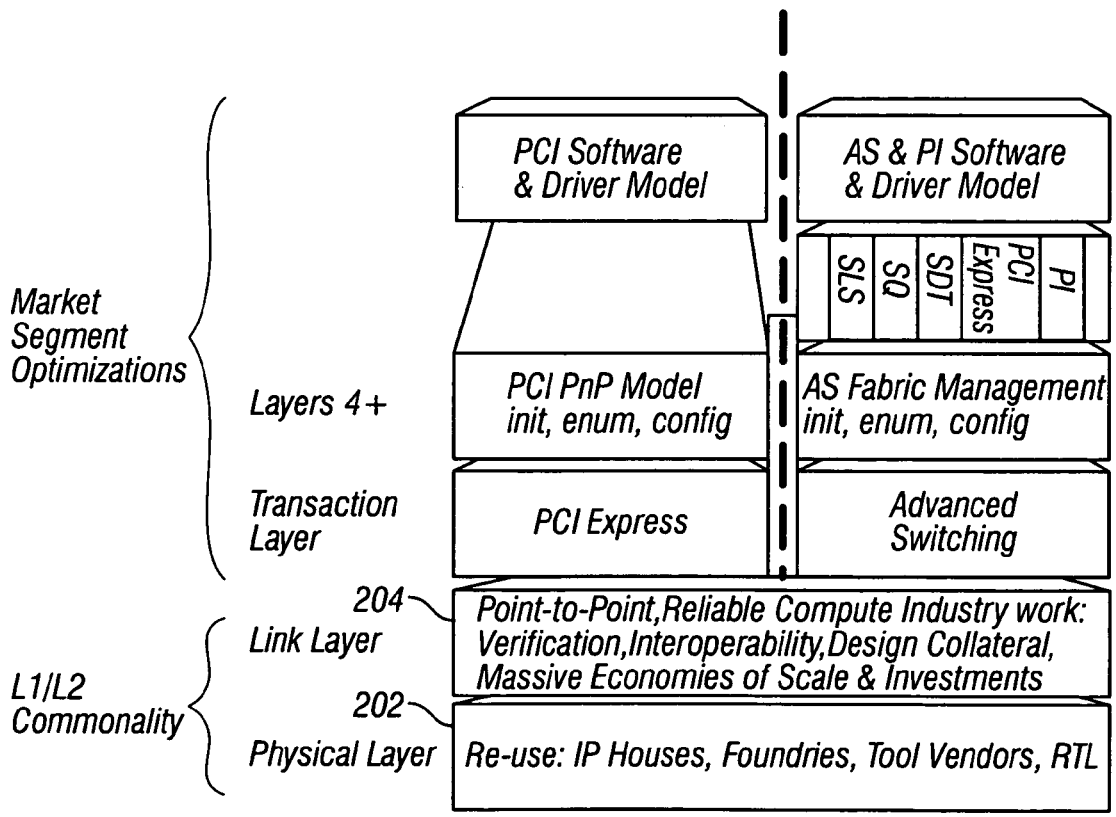
FIG. 2 is a diagram of protocol stacks.

Each switch element 102 and end point 104 has an Advanced Switching (AS) interface that is part of the AS architecture defined by the "Advance Switching Core Architecture Specification" (available from the Advanced Switching Interconnect-SIG at www.asi-sig.com). The AS architecture utilizes a packet-based transaction layer protocol that operates over the PCI Express physical and data link layers 202, 204, as shown in FIG. 2.

Figure 3:
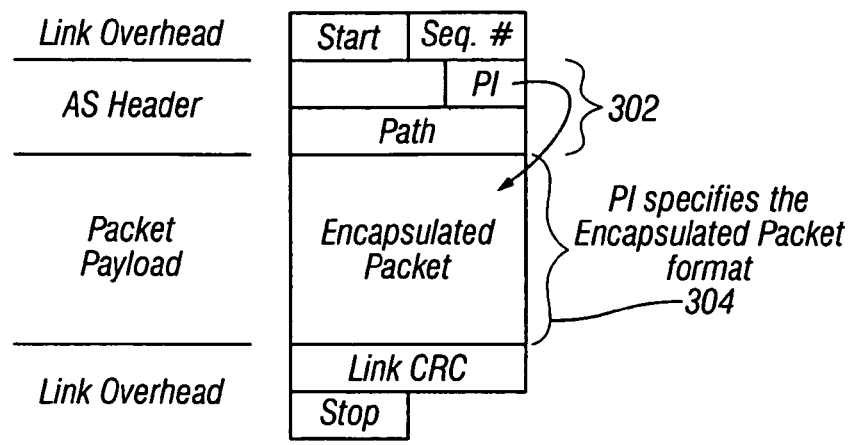
FIG. 3 is a diagram of an AS transaction layer packet (TLP) format.

AS uses a path-defined routing methodology in which the source of a packet provides all information required by a switch (or switches) to route the packet to the desired destination. FIG. 3 shows an AS transaction layer packet (TLP) format 300. The packet includes a route header 302 and an encapsulated packet payload 304. The AS route header 302 contains the information that is necessary to route the packet through an AS fabric (i.e., "the path"), and a field that specifies the Protocol Interface (PI) of the encapsulated packet. AS switches route packets using the information contained in the route header 302 without necessarily requiring interpretation of the contents of the encapsulated packet 304.

Figure 4:
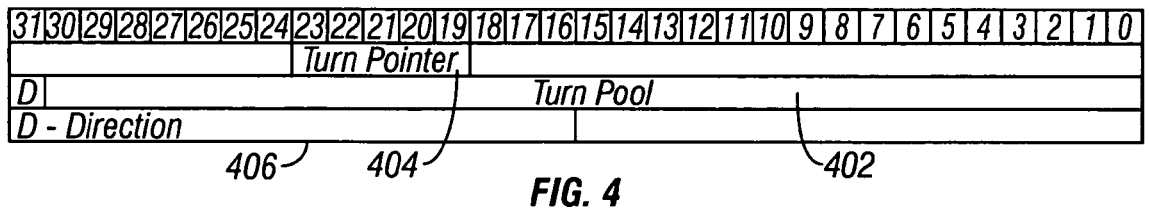
FIG. 4 is a diagram of an AS route header format.

A path may be defined by the turn pool 402, turn pointer 404, and direction flag 406 in the route header 302, as shown in FIG. 4. A packet's turn pointer indicates the position of the switch's "turn value" within the turn pool. When a packet is received, the switch may extract the packet's turn value using the turn pointer, the direction flag, and the switch's turn value bit width. The extracted turn value for the switch may then used to calculate the egress port.

The PI field in the AS route header 302 determines the format of the encapsulated packet 304. The PI field is inserted by the end point 104 that originates the AS packet and is used by the end point that terminates the packet to correctly interpret the packet contents. The separation of routing information from the remainder of the packet enables as AS fabric to tunnel packets of any protocol.

PIs represent fabric management and application-level interfaces to the switched fabric network 100. Table 1 provides a list of PIs currently supported by the AS Specification.

TABLE 1

AS protocol encapsulation interfaces

| PI number | Protocol Encapsulation Identity (PEI) |
|---|---|
| 0 | Fabric Discovery |
| 1 | Multicasting |
| 2 | Congestion Management |
| 3 | Segmentation and Reassembly |
| 4 | Node Configuration Management |
| 5 | Fabric Event Notification |
| 6 | Reserved |
| 7 | Reserved |
| 8 | PCI-Express |
| 9–223 | ASI-SIG defined PEIs |
| 224–254 | Vendor-defined PEIs |
| 255 | Invalid |

PIs 0-7 are used for various fabric management tasks, and PIs 8-254 are application-level interfaces. As shown in Table 1, PI-8 is used to tunnel or encapsulate a native PCI Express packet. Other PIs may be used to tunnel various other protocols, e.g., Ethernet, Fibre Channel, ATM (Asynchronous Transfer Mode), InfiniBand®, and SLS (Simple Load Store). An advantage of an AS switch fabric is that a mixture of protocols may be simultaneously tunneled through a single, universal switch fabric making it a powerful and desirable feature for next generation modular applications such as media gateways, broadband access routers, and blade servers.

The AS architecture supports the establishment of direct endpoint-to-endpoint logical paths through the switch fabric known as Virtual Channels (VCs). This enables a single switched fabric network to service multiple, independent logical interconnects simultaneously, each VC interconnecting AS end points for control, management and data. Each VC provides its own queue so that blocking in one VC does not cause blocking in another. Each VC may have independent packet ordering requirements, and therefore each VC can be scheduled without dependencies on the other VCs.

The AS architecture defines three VC types: Bypass Capable Unicast (BVC); Ordered-Only Unicast (OVC); and Multicast (MVC). BVCs have bypass capability, which may be necessary for deadlock free tunneling of some, typically load/store, protocols. OVCs are single queue unicast VCs, which are suitable for message oriented "push" traffic. MVCs are single queue VCs for multicast "push" traffic.

The AS architecture provides a number of congestion management techniques, one of which is a credit-based flow control technique that ensures that packets are not lost due to congestion. Link partners (e.g., an end point 104 and a switch element 102) in the network exchange flow control credit information to guarantee that the receiving end of a link has the capacity to accept packets. Flow control credits are computed on a VC-basis by the receiving end of the link and communicated to the transmitting end of the link. Typically, packets are transmitted only when there are enough credits available for a particular VC to carry the packet. Upon sending a packet, the transmitting end of the link debits its available credit account by an amount of flow control credits that reflects the packet size. As the receiving end of the link processes (e.g., forwards to an end point 104) the received packet, space is made available on the corresponding VC and flow control credits are returned to the transmission end of the link. The transmission end of the link then adds the flow control credits to its credit account.

The AS architecture supports the implementation of an AS Configuration Space in each AS device (e.g., AS end point 104) in the network. The AS Configuration Space is a storage area that includes fields to specify device characteristics as well as fields used to control the AS device. The AS Configuration Space includes up to 16 apertures where configuration information can be stored. Each aperture includes up to 4 Gbytes of storage and is 32-bit addressable. The configuration information is presented in the form of capability structures and other storage structures, such as tables and a set of registers. Table 2 provides a set of capability structures ("AS Native Capability Structures") that are defined by the AS Specification and stored in aperture 0 of the AS Configuration Space.

TABLE 2

AS Native Capability Structures

| AS Native Capability Structure | End points | Switch Elements |
| --- | --- | --- |
| Baseline Device | R | R |
| Spanning Tree | R | R |
| Spanning Tree Election | O | N/A |
| Switch Spanning Tree | N/A | R |
| Device PI | O | O |

TABLE 2-continued

AS Native Capability Structures

| AS Native Capability Structure | End points | Switch Elements |
| --- | --- | --- |
| Scratchpad | R | R |
| Doorbell | O | O |
| Multicast Routing Table | N/A | O |
| Semaphore | R | R |
| AS Event | R | R |
| AS Event Spooling | O | N/A |
| AS Common Resource | O | N/A |
| Power Management | O | N/A |
| Virtual Channels | R w/OE | R w/OE |
| Configuration Space Permission | R | R |
| End point Injection Rate Limit | O | N/A |
| Status Based Flow Control | O | O |
| Minimum Bandwidth Scheduler | N/A | O |
| Drop Packet | O | O |
| Statistics Counters | O | O |
| SAR | O | N/A |
| Integrated Devices | O | N/A |

Legend:
O = Optional normative
R = Required
R w/OE = Required with optional normative elements
N/A = Not applicable The information stored in the AS Native Capability Structures can be accessed through node configuration packets, e.g., PI-4 packets, which are used for device management.

In one implementation of a switched fabric network, the AS devices on the network are restricted to read-only access of another AS device's AS Native Capability Structures, with the exception of one or more AS end points that have been elected as fabric managers.

A fabric manager election process may be initiated by a variety of either hardware or software mechanisms to elect one or more fabric managers for the switched fabric network. A fabric manager is an AS end point that "owns" all of the AS devices, including itself, in the network. If multiple fabric managers, e.g., a primary fabric manager and a secondary fabric manager, are elected, then each fabric manager may own a subset of the AS devices in the network. Alternatively, the secondary fabric manager may declare ownership of the AS devices in the network upon a failure of the primary fabric manager, e.g., resulting from a fabric redundancy and fail-over mechanism.

Once a fabric manager declares ownership, it has privileged access to its AS devices' AS Native Capability Structures. In other words, the fabric manager has read and write access to the AS Native Capability Structures of all of the AS devices in the network.

As previously discussed, the AS Native Capability Structures of an AS device are accessible through PI-4 packets. Accordingly, each AS device in the switched fabric network can be implemented to include an AS PI-4 unit for processing PI-4 packets received through the network from a fabric manager or another AS device. In the examples to follow, the term "local AS device" refers to an AS device that has received a PI-4 packet and is processing the PI-4 packet, and the term "remote AS device" refers to an AS device, e.g., a fabric manager or another AS device, on the network that is attempting to access the local AS device's AS Native Capability Structures.

Figure 5:
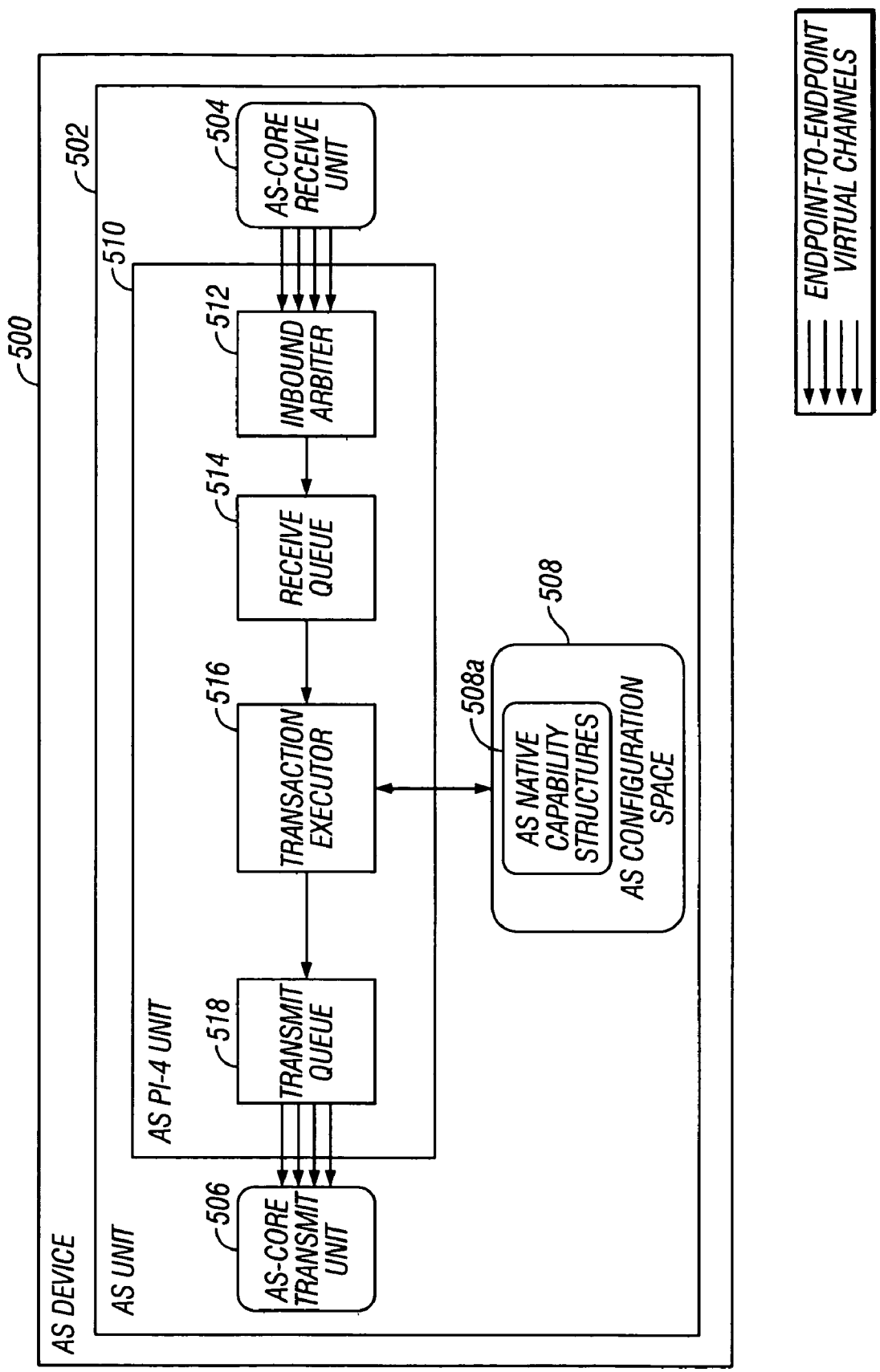
FIG. 5 is a diagram of an AS device with a PI-4 unit.

Referring to FIG. 5, the local AS device 500 includes an AS unit 502 that implements the AS transaction layer operating over the physical and data link layers. In one example, the AS unit 502 includes an AS-Core receive unit 504, an AS-Core transmit unit 506, an AS Configuration Space 508, and a PI-4 unit 510 for processing PI-4 packets received at the AS device 500. The AS Configuration Space 508 includes one or more AS Native Capability Structures 508a.

PI-4 packets received at the local AS device 500 are passed from the physical and data link layers to the PI-4 unit 510 for processing through the AS-Core receive unit 504. In one implementation, an inbound arbiter 512 in the PI-4 unit 510 arbitrates access between multiple VCs in the AS-Core receive unit 504 and a single receive queue 514 in round-robin fashion. The receive queue 514 provides buffer space for incoming PI-4 packets so that the PI-4 packets can be removed from the VCs in the AS-Core receive unit 504 as quickly as possible. There is an inherent latency involved in accessing the AS device's AS Configuration Space 508. Having the receive queue 514 in the PI-4 unit 510 shields this latency from the AS-Core receive unit 504, thus allowing flow control credits to be made available quickly to remote AS devices.

The receive queue 514 can be implemented as a first-in-first-out (FIFO) structure that passes PI-4 packets to a transaction executor 516 in the order it receives them. Upon receipt of a PI-4 packet, the transaction executor 516 may perform one or more packet validation operations prior to processing the packet. In one example, the transaction executor 516 performs a payload check to determine whether the actual payload size of the packet is equal to the payload size indicated in the packet header. In another example, the transaction executor 516 performs a configuration space permissions check to determine whether the remote AS device from which the PI-4 packet originated has the appropriate permission, e.g., a write permission, to access the local AS device's AS Native Capability Structures. If the PI-4 packet is invalid, the transaction executor 516 discards the PI-4 packet, generates an error signal, and sends the error signal to a processor external to the PI-4 unit 510. In one implementation, the external processor (not shown) generates a PI-5 (event notification) packet in response to the error signal.

If the received PI-4 packet is valid, the transaction executor 516 identifies the packet type using the field values associated with an Operation Type field in the AS route header. Table 3 shows how a packet is identified using the Operation Type field.

TABLE 3

PI-4 packet types

| PI-4 Packet Type | Operation Type |
| --- | --- |
| Write | 000 |
| Read Request | 100 |
| Read Completion with Data | 101 |
| Read Completion with Error | 111 |

If the valid PI-4 packet is identified as a write packet, the transaction executor 516 processes a write command to write data, e.g., extracted from the payload of the received PI-4 packet, to a location in an AS Native Capability Structure 508a specified by an aperture number and address in the received PI-4 packet header.

If the valid PI-4 packet is identified as a read request packet, the transaction executor 516 processes a read request command to retrieve data from a location in the AS Native Capability Structure 508a specified by an aperture number and address in the PI-4 packet header. If a failure occurs before or while the data is being retrieved from the AS Native Capability Structure 508a, the transaction executor 516 generates an AS payload having a PI-4 Read Completion with Error packet header. Within the PI-4 Read Completion with Error packet header, the transaction executor 516 provides a value in a Status Code field that indicates the type of failure that occurred during the data retrieval process. Any partial data that may have been retrieved is typically discarded rather than provided to the remote AS device.

If the data retrieval is successful, the transaction executor 516 generates an AS payload by appending the retrieved data to a PI-4 Read Completion with Data packet header. Within the PI-4 Read Completion with Data packet header, the transaction executor 516 provides a value in the Payload Size field that indicates the size of the retrieved data.

In both cases, the transaction executor 516 generates a PI-4 packet by attaching an AS route header to the AS payload. The generated PI-4 packet is sent to the transmit queue 518, which requests access and transfers the generated PI-4 packet to one of multiple VCs in the AS-Core transmit unit 506. The PI-4 packet is then returned to the remote AS device through the switched fabric network 100.

According to the AS Switching Core Architecture Specification, an AS device accesses the AS Configuration Space of another AS device through the use of PI-4 packets. The AS Switching Core Architecture Specification does not provide for local access of the AS Configuration Space through the use of PI-4 packets.

Figure 6:
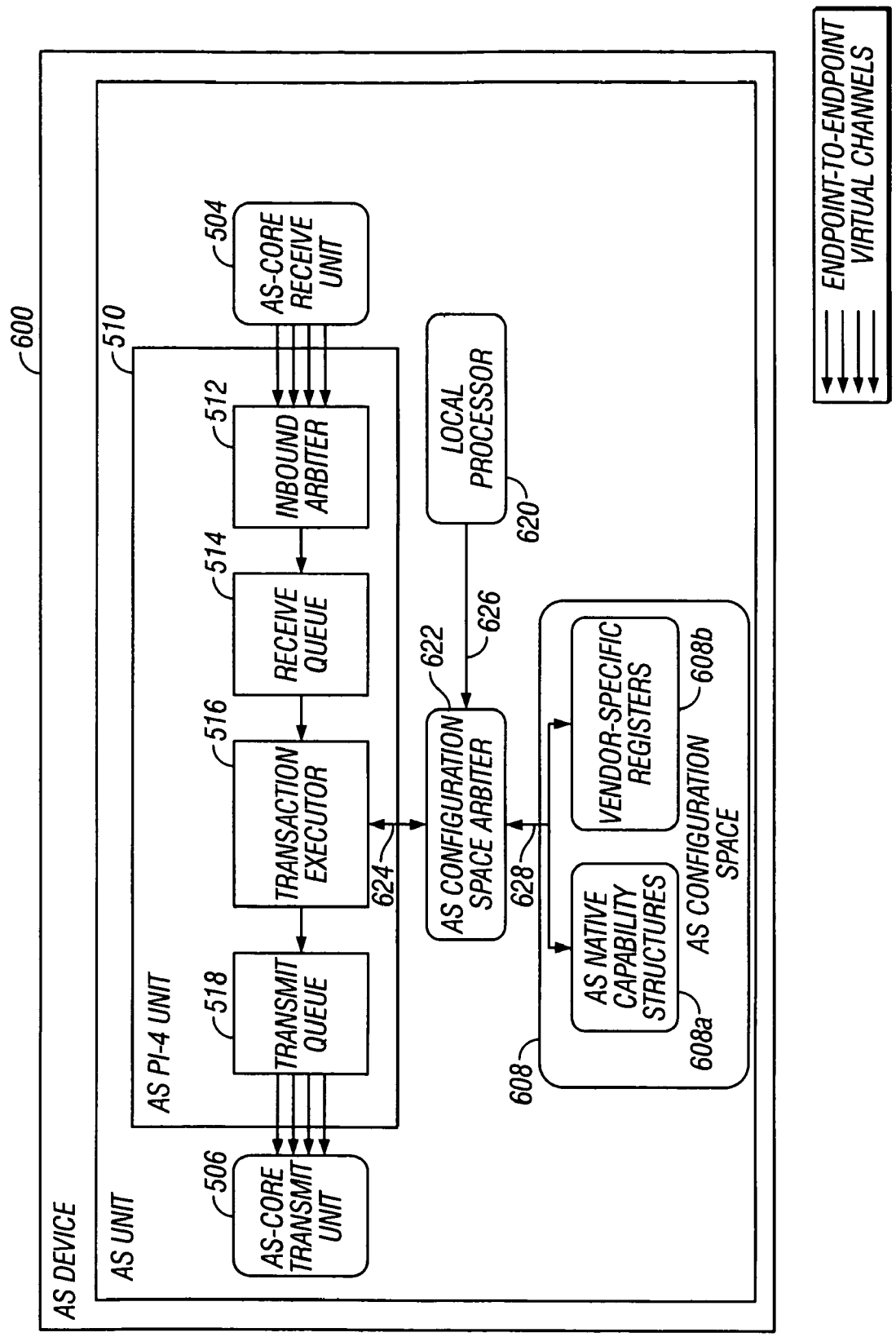
FIG. 6 is a diagram of an AS device with an AS Configuration Space Arbiter.

FIG. 6 shows an example of an AS device 600 implemented to provide a local processor 620 access to the AS device's AS Configuration Space 608 through an AS Configuration Space Arbiter ("ASCSA") unit 622. The AS device 600 includes an AS-Core receive unit 504, an AS-Core transmit unit 506, and a PI-4 unit 510 corresponding to those shown in FIG. 5.

The AS Configuration Space 608 includes a first memory segment assigned to a storage device referred to as AS Native Capability Structures 608a, and a second memory segment assigned to a storage device referred to as Vendor-Specific Registers 608b. Both of the storage devices are attached to the ASCSA unit 622 by a bus (described below). The Vendor-Specific Registers 608b are typically implemented to be accessible only by the local processor 620 on the AS device 600. In other words, the Vendor-Specific Registers 608b form a hidden storage device in the AS device 600 that is "invisible" to remote AS devices and inaccessible through the use of PI-4 packets.

The Vendor-Specific Registers 608b generally include local status and control information that may be used by the local processor 620 to control the behavior and functionality of the AS device 600. In one example, a VC arbitration table, which the AS-Core transmit unit 506 uses to select which VC to choose for transmission, is stored in the Vendor-Specific Registers 608b. Use of the VC arbitration table can have a significant effect on system performance. It is therefore advantageous to maintain the "invisibility" of the VC arbitration table to the switch fabric as a proprietary algorithm is typically used for programming the table. In another example, implementation mode bits to control certain modes of operation are stored in the Vendor-Specific Registers 608b. For instance, a PI-8 "PCI-Express to Advanced Switching Bridge" bit stored in the Vendor-Specific Registers 608b can be enabled in order to allow a PI-8 unit (not shown) on the AS device 600 to process PI-8 packets.

Figure 7:
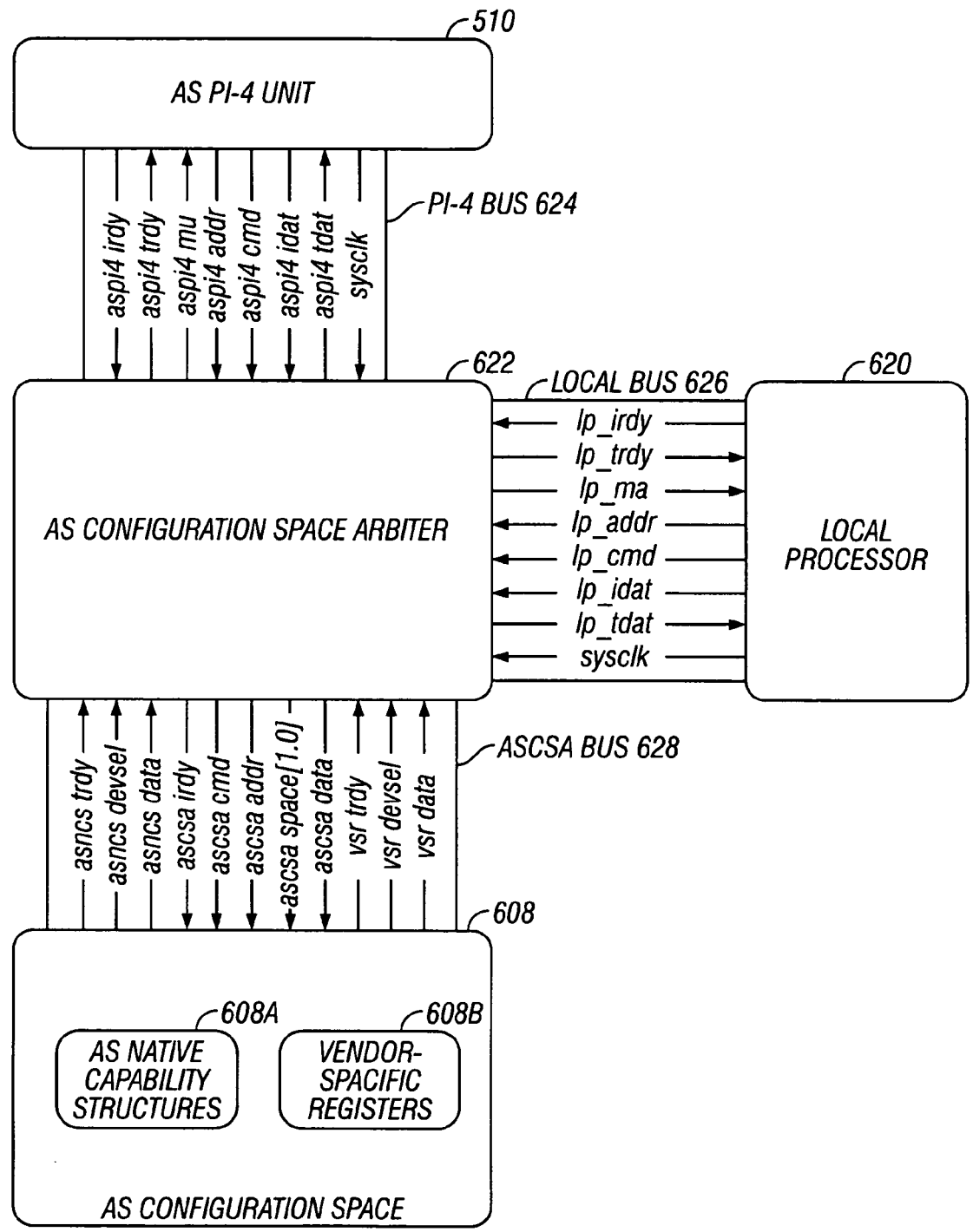
FIG. 7 is a diagram of the bus connections within the AS device of FIG. 6.

The AS Configuration Space Arbiter ("ASCSA") unit 622 arbitrates access to the AS Configuration Space 608 between the PI-4 unit 510 and the local processor 620. The ASCSA unit 622 is connected to the PI-4 unit 510 by a PI-4 bus 624, connected to the local processor 620 by a local bus 626, and connected to the AS Configuration Space 608 by an ASCSA bus 628. One example of the bus connections between the PI-4 unit 510, local processor 620, and the AS Configuration Space 608 is shown in FIG. 7, and described in more detail below with reference to exemplary interface and interface protocols.

A synchronous transfer interface between the PI-4 unit 510 and the ASCSA unit 622 includes the following PI-4 interface signals and buses: aspi4_irdy, aspi4_trdy, aspi4_ma, aspi4_addr, aspi4_cmd, aspi4_idat, aspi4_tdat, and sysclk. The sysclk signal is a synchronous clocking signal. The aspi4_addr signal specifies the target address for read and write operations, which is typically a 32-bit or a 64-bit address. The aspi4_cmd signal is a single bit signal that specifies whether the current transaction is read or a write operation. For write operations, data is transferred from the PI-4 unit 510 to the ASCSA unit 622 on the aspi4_idat bus. For read operations, the read data is returned from the target storage device (e.g., an AS Native Capability Structure 608a or a Vendor-Specific Register 608b) to the PI-4 unit 510 via the aspi4_tdat bus. Both the aspi4_idat and aspi4_tdat buses may be 32-, 64-, or 128-bits wide.

The aspi4_irdy signal is an "initiator ready" signal which indicates to the ASCSA unit 622 that the PI-4 unit 510 has a packet to transfer. When the ASCSA unit 622 is ready to accept the packet (e.g., a data word), it asserts the aspi4_trdy signal, and data is transferred when both the aspi4_irdy and aspi4_trdy signals are simultaneously asserted on a rising edge of the sysclk signal. The address specified on the aspi4_addr bus may be invalid, in which case the ASCSA unit 622 will assert the aspi4_ma signal along with the aspi4_trdy signal in response to the aspi4_irdy signal, effectively terminating the transaction. This mechanism is in place to prevent a lock-up of the synchronous transfer interface between the PI-4 unit 510 and the ASCSA unit 622.

A local processor 620 interface between the local processor 620 and the ASCSA unit 622 includes the following signals and buses: lp_irdy, lp_trdy, lp_ma, lp_addr, lp_cmd, lp_idat, lp_tdat, and sysclk. In one implementation, the local processor 620 interface signals and buses function in a manner similar to the corresponding the PI-4 interface signals and buses. For example, the lp_addr signal specifies the target address for read and write operations, and the lp_cmd signal is a single bit signal that specifies whether the current transaction is read or a write operation.

The ASCSA unit 622 interfaces to multiple attached storage devices 608a, 608b, that collectively form the AS Configuration Space 608, through a synchronous distributed bus interface and protocol ("ASCSA interface"). The common signals of the ASCSA interface are ascsa_irdy, ascsa_cmd, ascsa_addr, ascsa_space[1:0], and ascsa_data. Since the ASCSA interface is a distributed bus, each storage device 608a, 608b attached to the bus provides a unique set of signals referred to as *_trdy, *_devsel, and *_data. In FIG. 7, the ASCSA bus 628 is shown connecting to AS Configuration Space 608, which consists of an AS Native Capability Structures 608a and a Vendor Specific Registers. Each of these storage devices 608a, 608b provides a unique set of signals to the ASCSA unit 622. For the AS Native Capability Structures 608a, these signals are asncs_trdy, asncs_devsel, and asncs_data. For the Vendor Specific Registers 608b, the signals are vsr_trdy, vsr_devsel, and vsr_data.

A transaction is initiated on the ASCSA bus 628 when the ascsa_cmd, ascsa_addr, ascsa_space[1:0], and ascsa_data signals are driven and the ascsa_irdy signal is asserted. Each storage device 608a, 608b attached to the ASCSA bus 628 must positively decode the ascsa_addr and ascsa_space[1:0] buses, and in the next clock cycle, assert the *_devsel signal. If all *_devsel signals are deasserted, the ASCSA unit 622 aborts and terminates the transaction on the requesting interface. If the selected storage area device 608a, 608b is ready to receive or drive data, *_trdy signal may be asserted simultaneously with the *_devsel signal. If the selected storage device 608a, 608b needs to insert wait states, it may delay assertion of the *_trdy signal, but the *_devsel signal is asserted on the clock cycle following assertion of the ascsa_irdy signal. If the ascsa_cmd signal indicates a read transaction, the *_data signal must be driven from the selected storage device 608a, 608b when the *_trdy signal is asserted.

The ascsa_space[1:0] signal identifies four separate configuration spaces which are decoded by each storage device 608a, 608b attached to the ASCSA bus 628. In one implementation, the encodings for the ascsa_space[1:0] signal are "00" to identify aperture 0 of the AS Native Capability Structures 608a, "01" to identify aperture 1 of the AS Native Capability Structures 608a, and "10" to identify the Vendor Specific Registers 608b. The apertures 0 and 1 specify different regions in the AS Native Capability Structure address space 608a. The PI-4 unit 510 extracts the aperture number 0 or 1 directly from the PI-4 packets. Since the PI-4 unit 510 may only access AS Native Capability Structures 608a and not the Vendor-Specific Registers 608b, transactions on the PI-4 interface do not generate a "10" code on the ascsa_space[1:0] bus. This is one mechanism used by the ASCSA unit 622 to ensure that the Vendor-Specific Registers 608b remain "invisible" to the AS fabric.

On the local processor interface, each space is accessed by decoding assigned regions in memory, and translating addresses within that region to access the appropriate AS Native Capability Structure 608a, including aperture number, or Vendor-Specific Register 608b. In one implementation, the address decoding is accomplished by instantiating a standard PCI type 0 configuration space, and associating the instantiated PCI device with memory mapped accesses to the AS Configuration Space 608. Three separate Base Address Registers ("BARs") are assigned for each region in the AS Configuration Space 608. The first BAR is assigned to aperture 0 of the AS Native Capability Structures 608a, the second BAR is assigned to aperture 1 of the AS Native Capability Structures 608a, and the third BAR is assigned to the Vendor Specific Register 608b. When the local processor 620 generates an address on the lp_addr bus that matches one of the BARs, the ASCSA unit 622 decodes the address and sets the ascsa_space[1:0] bus accordingly. In this manner, the local processor 620 has access to both the AS Native Capability Structures 608a and the Vendor-Specific Registers 608b, while the PI-4 unit 510 is prevented from accessing the Vendor-Specific Registers 608b.

Figure 8:
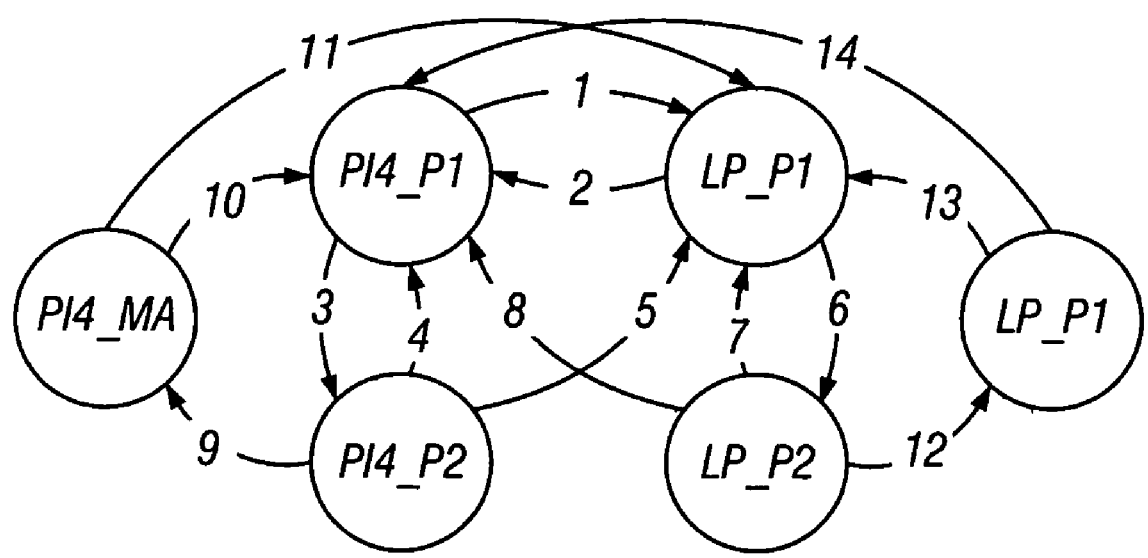
FIG. 8 is an AS Configuration Space Arbiter state diagram.

The ASCSA unit 622 arbitrates access to the ASCSA bus 628 from the two requesting interfaces (i.e. the local processor 620 and the PI-4 unit 510). FIG. 8 shows a state diagram "ASCSA FSM" of one implementation of the ASCSA unit 622. The ASCSA FSM is initialized to the PI4_P1 state, which multiplexes the aspi4_irdy, aspi4_addr, aspi4_cmd, and aspi4_idat signals to the ascsa_irdy, ascsa_addr, ascsa_cmd, and ascsa_data signals, respectively. When aspi4_irdy is asserted, the target storage device on the ASCSA bus 628 positively decodes the address on ascsa_addr, which is generated from the aspi4_addr bus. The target storage device also decodes the ascsa_space[1:0] bus, which is generated by the ASCSA unit 622.

If neither the PI-4 interface nor the local processor interface actively requests access to the ASCSA bus 628, then the ASCSA FSM "parks" in the PI4_P1 state. There are two possible transitions from the PI4_P1 state. If the local processor 620 asserts the lp_irdy signal, transition #1 to the LP_P1 state occurs. If the aspi4_irdy signal is asserted, transition #3 to the PI4_P2 state occurs.

In the PI4_P2 state, the PI-4 unit interface is multiplexed onto the ASCSA bus interface identically as in the PI4_P1 state. Additionally, the *_trdy signal is multiplexed onto the aspi4_trdy signal of the PI-4 unit interface. When *_trdy is asserted, data is transferred between the PI-4 unit 510 and the target storage device 608a, 608b on the ASCSA bus 628, and one of three transitions may occur. Transition #4 to the PI4_P1 state occurs when the target storage device asserts the *_trdy and *_devsel signals and the local processor interface is idle. If the local processor interface has an active request, transition #5 to the LP_PL state occurs. Transition #9 to the PI4_MA state occurs when none of the target storage devices 608a, 608b on the ASCSA bus 628 assert their *_devsel signals.

In the PI4_MA state, the aspi4_ma master abort signal is asserted along with the aspi4_trdy signal, effectively terminating the transition on the PI-4 unit interface. Two transitions from the PI4_MA state are possible. Transition #10 occurs if the local processor interface is idle, and transition #11 occurs if the local processor interface has an active request.

If the local processor 620 is actively requesting access to the ASCSA bus 628, the ASCSA FSM will eventually reach the LP_PL state. In LP_PL, the lp_irdy, lp_addr, lp_cmd, and lp_idat signals are multiplexed onto the ascsa_irdy, ascsa_addr, ascsa_cmd, and ascsa_data signals, respectively. When the lp_irdy signal is asserted, the target storage device 608a, 608b on the ASCSA bus 628 positively decodes the address on the ascsa_addr bus, which is generated from the lp_addr bus. The target storage device 608a, 608b also decodes the ascsa_space[1:0] bus, which is generated by the ASCSA unit 622. Two transitions from the LP_P1 state may occur. If the local processor interface is idle, and the PI-4 unit interface has an active request, then transition #2 to the PI4_P1 state occurs. Otherwise, if the local processor interface has an active request (i.e., the lp_irdy signal is asserted), then transition #6 to the LP_P2 state occurs.

In LP_P2, the lp_* signals are multiplexed onto the ASCSA bus 628 as in the LP_P1 state. Additionally, the *_trdy signal is multiplexed onto the lp_trdy signal of the local processor interface. When the *_trdy signal is asserted, data is transferred between the local processor 620 and the target storage device 608a, 608b, and one of three transitions occurs. Transition #7 to the LP_P1 state occurs when the target storage device 608a, 608b asserts its *_trdy and *_devsel signals and the PI-4 unit interface is idle. If the PI-4 unit interface has an active request, transition #8 to the PI4_P1 state occurs. Transition #12 to the LP_MA state occurs when none of the target storage devices 608a, 608b on the ASCSA bus 628 assert their *_devsel signals.

In the LP_MA state, the lp_ma master abort signal is asserted along with the lp_trdy signal, effectively terminating the transition on the local processor interface. Two transitions from the LP_MA state are possible. Transition #13 occurs if the PI-4 unit interface is idle, and transition #14 occurs if the local PI-4 unit interface has an active request.

The invention and all of the functional operations described in this specification can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A method comprising:
at a first Advanced Switching Interconnect (ASI) device having a memory space partitioned into at least a first memory segment and a second memory segment,
receiving a request for access to the first memory segment of the first ASI device;
determining whether a source of the request is local to the first ASI device; and
processing the request based on the determining.

2. The method of claim 1, wherein processing the request comprises:
denying the request for access to the first memory segment of the first ASI device, the first memory segment being assigned to a hidden storage device of the first ASI device, if the source of the request is identified as being a node configuration packet processor of a second, different ASI device.

3. The method of claim 1, wherein the first memory segment is assigned to a hidden storage device and the second memory segment is assigned to an exposed storage device.

4. The method of claim 2, wherein the node configuration packet processor comprises an ASI Protocol Interface 4 (PI-4) unit for processing PI-4 node configuration packets received over an ASI fabric.

5. The method of claim 1, wherein processing the request comprises:
granting the request for access to the first memory segment of the first ASI device, the first memory seament being assigned to a hidden storage device of the first ASI device, if the source of the request is identified as being a local processor of the first ASI device.

6. The method of claim 1, wherein processing the aeeess request comprises:
retrieving data from an address location in the memory space specified by the request; and
providing the retrieved data to the source of the request.

7. The method of claim 1, wherein processing the request comprises:
writing data to an address location in the memory space specified by the request.

8. An apparatus comprising:
a memory space of a first Advanced Switching Interconnect (ASI) device, the memory space being partitioned into at least a first memory segment and a second memory segment; and
a memory space arbiter operative to:
receive a request for access to the first memory segment of the first ASI device;
determine whether a source of the request is local to the first ASI device; and
process the request based on the determination.

9. The apparatus of claim 8, wherein the request for access comprises:
a request for control of a memory space arbiter bus connecting the memory space to the memory space arbiter.

10. The apparatus of claim 8, wherein the memory space arbiter is further operative to:
deny the recquest for access to the first memory segment of the first ASI device, the first memory segment being assigned to a hidden storage device of the first ASI device, if the source of the recluest is identified as being a node configuration packet processor of a second, different ASI device.

11. The apparatus of claim 8, wherein the first memory segment is assigned to a hidden storage device and the second memory segment is assigned to an exposed storage device.

12. The apparatus of claim 10, wherein the node configuration packet processor comprises an ASI Protocol Interface 4 (PI-4) unit for processing PI-4 node configuration packets received over an ASI fabric.

13. The apparatus of claim 8, wherein the memory space arbiter is further operative to:
grant the request for access to the first memory segment of the first ASI device, the first memory segment being assigned to a hidden storage device of the first ASI device, if the source of the request is identified as being a local processor of the first ASI device.

14. The apparatus of claim 8, wherein the memory space arbiter is further operative to:
retrieve data from an address location in the memory space specified by the request; and
provide the retrieved data to a source of the request.

15. The apparatus of claim 8, wherein the memory space arbiter is further operative to:
write data to an address location in the memory space specified by the request.

16. The apparatus of claim 8, wherein:
the apparatus comprises the first ASI device;
the memory space comprises an ASI Configuration Space;
the second memory segment comprises one or more ASI Native Capability Structures; and
the first memory segment comprises one or more vendor-specific registers.

17. The apparatus of claim 16, wherein the one or more vendor-specific registers include local status and control information for the apparatus.

18. An article comprising a machine-readable medium storing machine-executable instructions, the instructions to cause a machine of a first Advanced Switching Interconnect (ASI) device having a memory space partitioned into at least a first memory seament and a second memory segment to:
receive a request for access to the first memory segment of the first ASI device;
determine whether a source of the request is local to the first ASI device; and
process the request based on the determination.

19. The article of claim 18, wherein instructions to cause the machine to process the request comprise instructions to cause the machine to:
deny the request for access to the first memory segment of the first ASI device, the first memory segment being assigned to a hidden storage device of the first ASI device, if the source of the request is identified as being a node configuration packet processor of a second, different ASI device.

20. The article of claim 18, wherein the first memory segment is assigned to a hidden storage device and the second memory segment is assigned to an exposed storage device.

21. The article of claim 19, wherein the node configuration packet processor comprises an ASI Protocol Interface 4 (PI-4) unit for processing PI-4 node configuration packets received over an ASI fabric.

22. The article of claim 18, wherein instructions to cause the machine to process the request comprise instructions to cause the machine to:

grant the request for access to the first memory segment of the first ASI device, the first memory segment being assigned to a hidden storage device of the first ASI device, if the source of the request is identified as being a local processor of the first ASI device.

23. The article of claim 18, wherein instructions to cause the machine to process the request comprise instructions to cause the machine to:

retrieve data from an address location in the memory space specified by the request; and provide the retrieved data to a the source of the request.

24. The article of claim 18, wherein instructions to cause the machine to process the access request comprise instructions to cause the machine to:

write data to an address location in the memory space specified by the request.

25. The article of claim 18, wherein:

the memory space comprises an ASI Configuration Space;

the second memory segment comprises one or more AS Native Capability Structures; and the first memory segment comprises one or more vendor-specific registers.

26. The article of claim 25, wherein the one or more vendor-specific registers include local status and control information for the ASI device.

27. A system comprising:

a first device that communicates with a second device over an Advanced Switching Interconnect (ASI) fabric, the first device having a memory space partitioned into at least a first memory segment and a second memory segment, the first device being capable of:

receiving a request for access to the first memory segment of the first device;

determining whether a source of the request is local to the first device; and processing the request based on the determining.

28. The system of claim 27, wherein the first device is further capable of:

denying the request for access to the first memory segment of the first device, the first memory segment being assigned to a hidden storage device of the first device, if the source of the request is identified as being a node configuration packet processor of the second device.

29. The system of claim 28, wherein the first memory segment is assigned to a hidden storage device and the second memory segment is assigned to an exposed storage device.

30. The system of claim 27, wherein the first device is further capable of:

granting the request for access to the first memory segment of the first device, the first memory segment being assigned to a hidden storage device of the first device, if the source of the request is identified as being a local processor of the first device.

* * * * *